No. 750,541. Patented January 26, 1904.

UNITED STATES PATENT OFFICE.

JOHN W. H. JAMES, OF PHILADELPHIA, PENNSYLVANIA.

MANUFACTURE OF WHITE LEAD.

SPECIFICATION forming part of Letters Patent No. 750,541, dated January 26, 1904.

Application filed May 10, 1902. Serial No. 106,757. (No specimens.)

*To all whom it may concern:*

Be it known that I, JOHN W. H. JAMES, a subject of the King of Great Britain and Ireland, and a resident of Philadelphia, Pennsylvania, have invented certain Improvements in the Manufacture of White Lead, of which the following is a specification.

My invention consists of certain improvements in that method of manufacturing white lead which consists in subjecting oxid of lead simultaneously to the action of acetic acid and carbonic-acid gas, the object of my invention being to accelerate the process and obtain a product free from particles of metallic lead and having a pure white color.

In carrying out my invention I mix one part of finely-ground oxid of lead with about two and one-half times its weight of water containing nitric or other available acid in quantity sufficient to attack and convert to the condition of a metallic salt any particles of metallic lead which may be combined with the oxid, care being taken, however, to so select and so limit the quantity of the acid employed that it will not have any injurious effect upon the oxid of lead. The water with which the oxid of lead is mixed is maintained in a state of agitation in the vessel in which the treatment is effected in order to keep the particles of metallic lead in suspension and enable the acid to act effectively upon the same, and during the treatment the mass is heated to a temperature of about 200° Fahrenheit. After reaching this temperature carbonic-acid gas and acetic acid are injected into the mixture, the acetic acid, by preference, not exceeding one-half of one per cent., by weight, of the water, and the carbonic-acid gas being, preferably, at a pressure of about fifteen pounds above that of the atmosphere. The entire mass of oxid having been expanded by the preliminary heating is rapidly acted upon by the acetic acid and carbonic-acid gas, and the conversion of the same into carbonate of lead takes place more completely and more rapidly than by any other process with which I am familiar.

In order to insure the production of a perfectly white product, I pass through the magma resulting from the foregoing treatment oxygen gas under pressure sufficient to insure its free passage, a pressure of about twenty pounds to the square inch having been found to be sufficient for the purpose.

Having thus described my invention, I claim and desire to secure by Letters Patent—

1. As an improvement in that process of making white lead which consists in subjecting oxid of lead to the action of acetic acid and carbonic-acid gas, heating said oxid of lead to about 200° Fahrenheit before the acetic acid and carbonic-acid gas is caused to act upon the same, substantially as specified.

2. As an improvement in that process of making white lead which consists in subjecting oxid of lead to the action of acetic acid and carbonic-acid gas, treating the resulting carbonate of lead with oxygen gas, substantially as specified.

3. The within-described method of making white lead which consists in first mixing oxid of lead with water containing acid whereby any metallic lead present with the oxid is converted into a salt, then heating the mixture, then subjecting it to the action of acetic acid and carbonic-acid gas whereby the oxid of lead is converted to a carbonate, and then subjecting the latter to the action of oxygen gas, substantially as specified.

In testimony whereof I have signed my name to this specification in the presence of two subscribing witnesses.

JOHN W. H. JAMES.

Witnesses:
 WALTER CHISM,
 JOS. H. KLEIN.